(12) United States Patent
Nakamoto

(10) Patent No.: US 6,595,766 B2
(45) Date of Patent: Jul. 22, 2003

(54) DIE CLAMPING APPARATUS, DIE CLAMPING FORCE MEASUREMENT METHOD AND DIE CLAMPING FORCE ADJUSTMENT METHOD

(75) Inventor: Toshinori Nakamoto, Kanagawa (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 347 days.

(21) Appl. No.: 09/770,224

(22) Filed: Jan. 29, 2001

(65) Prior Publication Data

US 2001/0026028 A1 Oct. 4, 2001

(30) Foreign Application Priority Data

Jan. 28, 2000 (JP) .......................................... 2000-024840

(51) Int. Cl.[7] .............................................. B29C 45/64
(52) U.S. Cl. ......................... 425/149; 425/169; 425/593
(58) Field of Search .................................. 425/149, 150, 425/169, 593, 451.6

(56) References Cited

U.S. PATENT DOCUMENTS

| | | | | |
|---|---|---|---|---|
| 4,281,977 A | * | 8/1981 | Farrell | 425/149 |
| 4,341,511 A | * | 7/1982 | Laurent et al. | 425/593 |
| 4,685,876 A | * | 8/1987 | Loscei | 425/593 |
| 5,045,253 A | * | 9/1991 | Kamiguchi et al. | 425/593 |
| 5,059,365 A | * | 10/1991 | Hertzer et al. | 425/593 |
| 5,149,471 A | * | 9/1992 | Catanzaro et al. | 425/149 |
| 6,413,453 B1 | * | 7/2002 | Onishi | 425/149 |

* cited by examiner

Primary Examiner—James P. Mackey
(74) Attorney, Agent, or Firm—Pillsbury Winthrop LLP

(57) ABSTRACT

A die clamping apparatus capable of correctly adjusting a die clamping force without direct detection of amounts of deformation of tie bars, having a fixed die plate, a movable die plate, a link housing, a toggle mechanism provided between the movable die plate and the link housing, a position adjustment unit provided between the link housing and the tie bars and connecting the link housing and the tie bars, a link housing position detection unit for detecting a first position of the link housing in a state where the movable die moves from a predetermined die open position to a die closing direction and a die clamping force has not been generated, and a second position of the link housing in a state where the clamping is completed, a die clamping force calculation unit for calculating the die clamping force based on the first and second positions, and a die clamping force adjustment unit for calculating an amount of compensation for compensating the position of the link housing so that the die clamping force becomes a reference die clamping force based on the calculated and reference die clamping force.

6 Claims, 10 Drawing Sheets

DIE CLAMPING APPARATUS, DIE CLAMPING FORCE MEASUREMENT METHOD AND DIE CLAMPING FORCE ADJUSTMENT METHOD

BACKGROUND OF THE INVENTION

1. Field of the Invention

The present invention relates to a die clamping apparatus having a toggle type clamping mechanism applied to a molding machine such as a die casting machine or an injection molding machine.

Also, the present invention relates to a die clamping force measurement method in a die clamping apparatus capable of correctly measuring the die clamping force.

Further, the present invention relates to a die clamping force adjusting method of a die clamping apparatus capable of correctly adjusting the die clamping force.

2. Description of the Related Art

In the die clamping apparatus of for example a die casting machine, a die clamping force of a pair of dies compatible with the injection pressure of molten metal at the time of injection is required. The die clamping apparatuses are roughly classified into direct pressure type die clamping apparatuses directly pressing against a movable die and toggle type die clamping apparatuses pressing against the same via a toggle mechanism.

In a toggle type die clamping apparatus, there is a self lock mechanism of the toggle mechanism, so there are various advantages such as saving of energy in comparison with a direct pressure type die clamping apparatus.

Here, an example of the configuration of a toggle type die clamping apparatus will be explained by referring to FIG. 1 to FIG. 4.

FIG. 1 is a longitudinal sectional view of the configuration of a toggle type die clamping apparatus. The upper half from the center line CL shows the state before the start of closing the die, while the lower half shows the state of completion of closing of the die. Further, FIG. 2 is a side view of the die clamping apparatus shown in FIG. 1.

In FIG. 1 and FIG. 2, a die clamping apparatus 200 is provided with a pair of dies 4 comprising a fixed die 4b and a movable die 4a, a link housing 1, a fixed die plate 2 with the fixed die 4b attached thereto, a movable die plate 3 with the movable die 4a attached thereto, a base 5, a toggle mechanism 6, a crosshead 7, a hydraulic cylinder 8, a piston rod 9, a guide rod 10, and tie bars 11.

The die clamping apparatus 200 is provided with an upper and lower pair of toggle mechanisms 6 comprising three links 6a, 6b, and 6c between the movable die plate 3 and the link housing 1.

The fixed die plate 2 is fixed to the base 5, and the link housing 1 and the movable die plate 3 are provided movably on the base 5.

The link housing 1 and the movable die plate 3 are connected by tie bars 11 as shown in FIG. 2. Usually, four tie bars 11 are provided.

The link 6c of the toggle mechanism 6 is pivotally connected to the crosshead 7, the hydraulic cylinder 8 is mounted at substantially the center portion of an outer end face of the link housing 1, and a front end of the piston rod 9 of this hydraulic cylinder 8 is connected to the crosshead 7.

The crosshead 7 is movably guided to the guide rod 10. This crosshead 7 moves along the guide rod 10 in accordance with the movement of the piston rod 9.

As shown in FIG. 2, when the piston rod 9 of the hydraulic cylinder 8 is advanced from a state where the links 6a, 6b, and 6c of the toggle mechanism 6 are folded and the links 6a, 6b, and 6c are extended, the movable die plate 3 moves toward the fixed die plate 2 and, as shown in FIG. 3, the movable die 4a contacts the fixed die 4b. In the state shown in FIG. 3, the links 6a, 6b, and 6c of the toggle mechanism 6 are not completely extended, and no die clamping force is generated between the movable die 4a and the fixed die 4b. Further, a distance H0 between the movable die plate 3 and the fixed die plate 2 in the state where the movable die 4a and the fixed die 4b contact and the die clamping force has not been generated between them is referred to as the die height.

When the piston rod 9 is further advanced from this state, the links 6a, 6b, and 6c of the toggle mechanism 6 become in almost straight alignment as shown in FIG. 4 and self lock. Further, by the extension of the toggle mechanism 6, the tie bars 11 connecting the link housing 1 and the fixed die plate 2 are stretched due to elastic deformation, a die clamping force in accordance with the amount of deformation of the tie bars 11 is generated between the movable die 4a and the fixed die 4b, and the link housing 1 moves on the base 5 with an amount of movement in accordance with the amount of deformation of the tie bars 11.

When the die height H0 is changed by the adjustment of the die clamping force or by a change of the die 4 in the die clamping apparatus 200 of the above configuration, the position relative to the fixed die plate 2 is adjusted by the link housing 1.

As the position adjustment device for adjusting the position of the link housing 1, for example a spur gear type position adjustment device or a chain type or worm gear type position adjustment device are known. Such a position adjustment device is built in the link housing 1. The position adjustment device basically is comprised of tie bar nuts screwed with the four tie bars 11. By controlling the rotation of these tie bar nuts in synchronization, the link housing 1 can be moved along the tie bars 11.

In the measurement of the die clamping force in the toggle type die clamping apparatus 200 having the above configuration, as disclosed in for example Japanese Examined Patent Publication (Kokoku) No. 5-74770, the method of embedding electric load meters in ends of the tie bars 11 at the link housing 1 side, directly detecting the amounts of deformation of the tie bars 11 at the time of clamping by the electric type load meters, and finding the die clamping force based on the amounts of deformation was employed.

With this method, however, there were the disadvantages that the cost of the electric load meters was high, the work for attachment of the electric load meters was troublesome, the cost of manufacture rose, maintenance of the detection precision was difficult, etc.

In order to overcome such disadvantages, a method of not directly measuring the amounts of deformation of the tie bars 11, but detecting the amount of movement of the link housing 1 relative to the base 5 when it shifts from a die open state as shown in FIG. 1 to a die closed state shown in FIG. 4 and calculating the die clamping force based on this amount of movement is disclosed in for example Japanese Examined Patent Publication (Kokoku) No. 5-36219. Namely, the die clamping force is calculated by regarding the amount of movement of the link housing 1 when it shifts from the die open state to the die closed state as the amount of deformation of the tie bars 11.

However, the position adjustment device is interposed between the link housing 1 and the tie bars 11. If mechanical error such as backlash exists between the tie bars 11 and the tie bar nuts screwed to them in this position adjustment device, the amount of the mechanical error is contained in the detected amount of movement of the link housing 1, so the amount of movement of the link housing 1 when it shifts from the die open state to the die closed state and the amounts of deformation of the tie bars 11 may not correctly coincide. For this reason, in the above method, the correct measurement of the die clamping force was difficult. Particularly, it was easily influenced by the backlash between the tie bar and the tie bar nut after adjusting the position of the link housing 1 by the position adjustment device so as to adjust the die clamping force and change the die height H0 by the change of the dies 4, so the die clamping force could not be correctly measured.

SUMMARY OF THE INVENTION

An object of the present invention is to provide a die clamping apparatus capable of correctly measuring a die clamping force without use of sensors such as load meters for directly detecting the amounts of deformation of the tie bars in the die clamping apparatus.

Another object of the present invention is to provide a die clamping apparatus capable of correctly and automatically adjusting the die clamping force.

Still another object of the present invention is to provide a method of measurement of die clamping force capable of correctly measuring the die clamping force without use of sensors such as load meters for directly detecting the amounts of deformation of the tie bars.

Still another object of the present invention is to provide a method of adjustment of die clamping force capable of correctly adjusting the die clamping force.

According to a first aspect of the present invention, there is provided a die clamping apparatus comprising a fixed die plate fixed on a base and holding a fixed die, a movable die plate for holding a movable die facing the fixed die and movable on the base, a link housing connected with the fixed die plate by tie bars while interposing the movable die plate therebetween and movable on the base, a toggle mechanism for generating a die clamping force between the movable die plate and the fixed die plate through the tie bars by moving apart the movable die plate and the link housing, a position adjusting means provided between the link housing and the tie bars and connecting the link housing and the tie bars so as to enable the position adjustment of the link housing to the tie bars, a link housing position detecting means for detecting a first position of the link housing on the base in a state where the movable die moves from a predetermined die open position to a die closing direction and a die clamping force has not been generated and a second position of the link housing on the base in a state where the clamping is completed, and a die clamping force calculating means for calculating the die clamping force based on a difference of the first and second positions detected by the link housing position detecting means.

Preferably, the die clamping apparatus further comprises a die clamping force adjusting means for calculating an amount of compensation for compensating the position of the link housing to the tie bars so that the die clamping force becomes a reference die clamping force based on a difference between the calculated die clamping force calculated by the die clamping force calculating means and the reference die clamping force set in advance and outputting the same to the position adjusting means.

According to a second aspect of the present invention, there is provided a die clamping force measurement method in a die clamping apparatus provided with a fixed die plate fixed on a base and holding a fixed die, a movable die plate for holding a movable die facing the fixed die and movable on the base, a link housing connected with the fixed die plate by tie bars while interposing the movable die plate therebetween and movable on the base, a toggle mechanism for generating a die clamping force between the movable die plate and the fixed die plate through the tie bars by moving apart the movable die plate and the link housing, and a position adjusting means provided between the link housing and the tie bars and connecting the related link housing and the tie bars so as to enable the position adjustment of the link housing to the tie bars, comprising steps of moving the movable die plate from the predetermined open position toward the fixed die plate by operating the toggle mechanism, detecting a first position of the link housing on the base in a state where the movable die plate moved and a die clamping force has not been generated, detecting a second position of the link housing on the base in a state where the clamping is completed, calculating an amount of movement of the link housing from the detected first and second positions of the link housing, and calculating the die clamping force based on the calculated amount of movement.

According to a third aspect of the present invention, there is provided a die clamping force adjusting method in a die clamping apparatus provided with a fixed die plate fixed on a base and holding a fixed die, a movable die plate for holding a movable die facing the fixed die and movable on the base, a link housing connected with the fixed die plate by tie bars while interposing the movable die plate therebetween and movable on the base, a toggle mechanism for generating a die clamping force between the movable die plate and the fixed die plate through the tie bars by moving apart the movable die plate and the link housing, and a position adjusting means provided between the link housing and the tie bars and connecting the link housing and the tie bars so as to enable the position adjustment of the link housing to the tie bars, comprising steps of moving the movable die plate from a predetermined open position toward the fixed die plate by operating the toggle mechanism, detecting a first position of the link housing on the base in a state where the movable die plate moved and a die clamping force has not been generated, detecting a second position of the link housing on the base in a state where the clamping is completed, calculating an amount of movement of the link housing from the detected first and second positions of the link housing, calculating the die clamping force based on the calculated amount of movement, calculating an amount of compensation for compensating the position of the link housing relative to the tie bar so that the die clamping force becomes a reference die clamping force based on a difference between the calculated die clamping force and the reference die clamping force set in advance, and outputting the same to the position adjusting means.

In the present invention, the movable die plate located at the predetermined die open position is moved toward the fixed die by operating the toggle mechanism. When the movable die plate moves, a reaction force from the toggle mechanism acts upon the link housing. This reaction force acting upon the link housing acts also upon the tie bars connected to the link housing through the position adjusting means.

At this time, if for example mechanical error such as backlash exists between nut members provided in the position adjusting means and the tie bars screwed therewith, this mechanical error will be eliminated by the reaction force acting upon the link housing.

Then, the first position of the link housing in the state where the backlash is eliminated as described above is detected.

Further, when the movable die and the fixed die are clamped, the tie bars extend by the elastic deformation, and the link housing moves in a direction moving apart from the movable die plate.

The second position of the link housing in the state where the die clamping is completed is detected.

The die clamping force calculating means calculates the die clamping force based on the difference of the first and second positions detected as described above, that is, the amount of movement of the link housing. The mechanical error existing in the position adjusting means is not contained in the amount of movement of this link housing, so the calculated die clamping force becomes the correct value.

Further, in the present invention, the amount of correction for correcting the position of the link housing so that the die clamping force becomes the reference die clamping force is calculated from the difference between the die clamping force calculated as described above and the die clamping force set in advance, then the position of the link housing is adjusted by the position adjusting means. At this time, the die clamping force calculated as described above is the correct value, so the position of the link housing is adjusted with a high precision.

BRIEF DESCRIPTION OF THE DRAWINGS

The above and other objects and novel features of the present invention will be more apparent from the following description of the preferred embodiments given in relation to the attached drawings, wherein.

DESCRIPTION OF THE PREFERRED EMBODIMENTS

Figure 1:
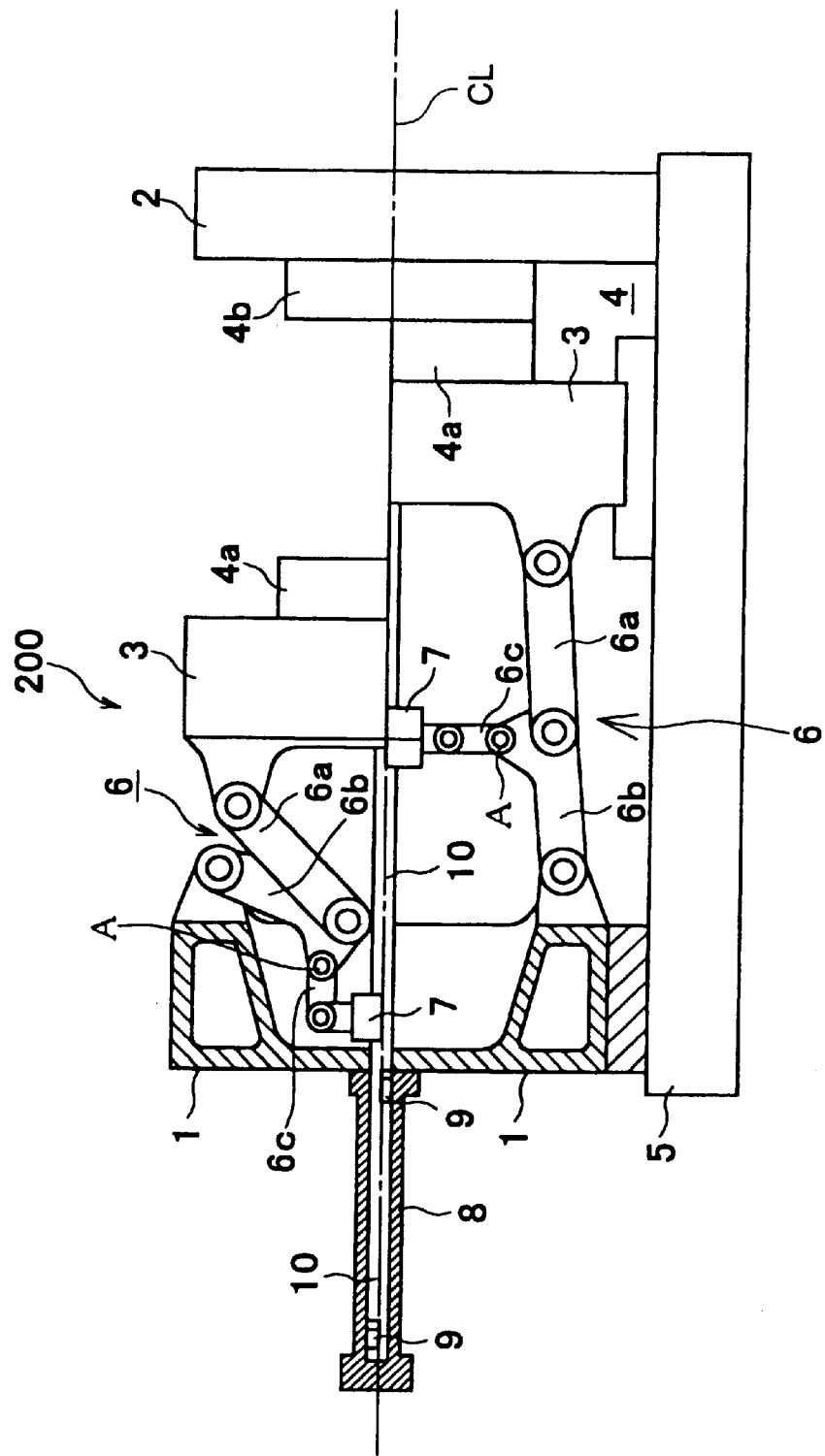
FIG. 1 is a view of an example of the configuration of a die clamping apparatus.
Figure 2:
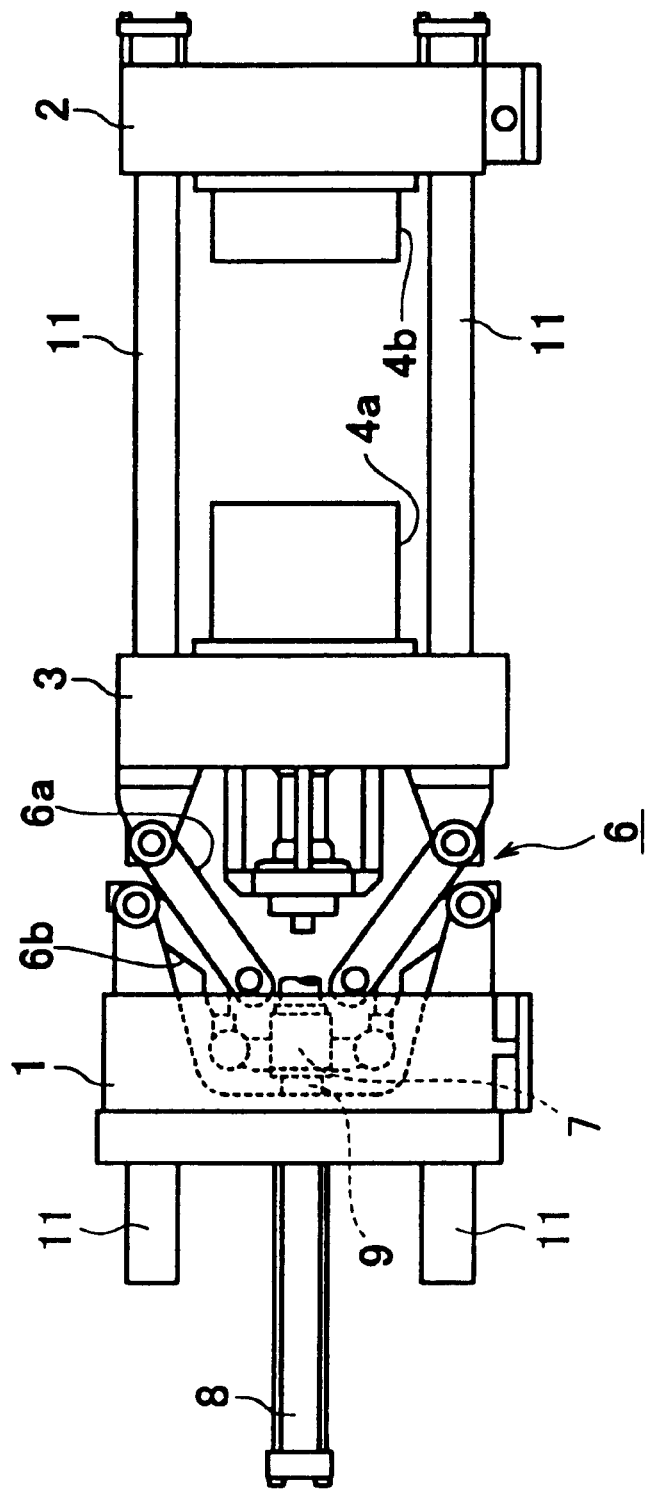
FIG. 2 is a side view of the die clamping apparatus shown in FIG. 1.
Figure 3:
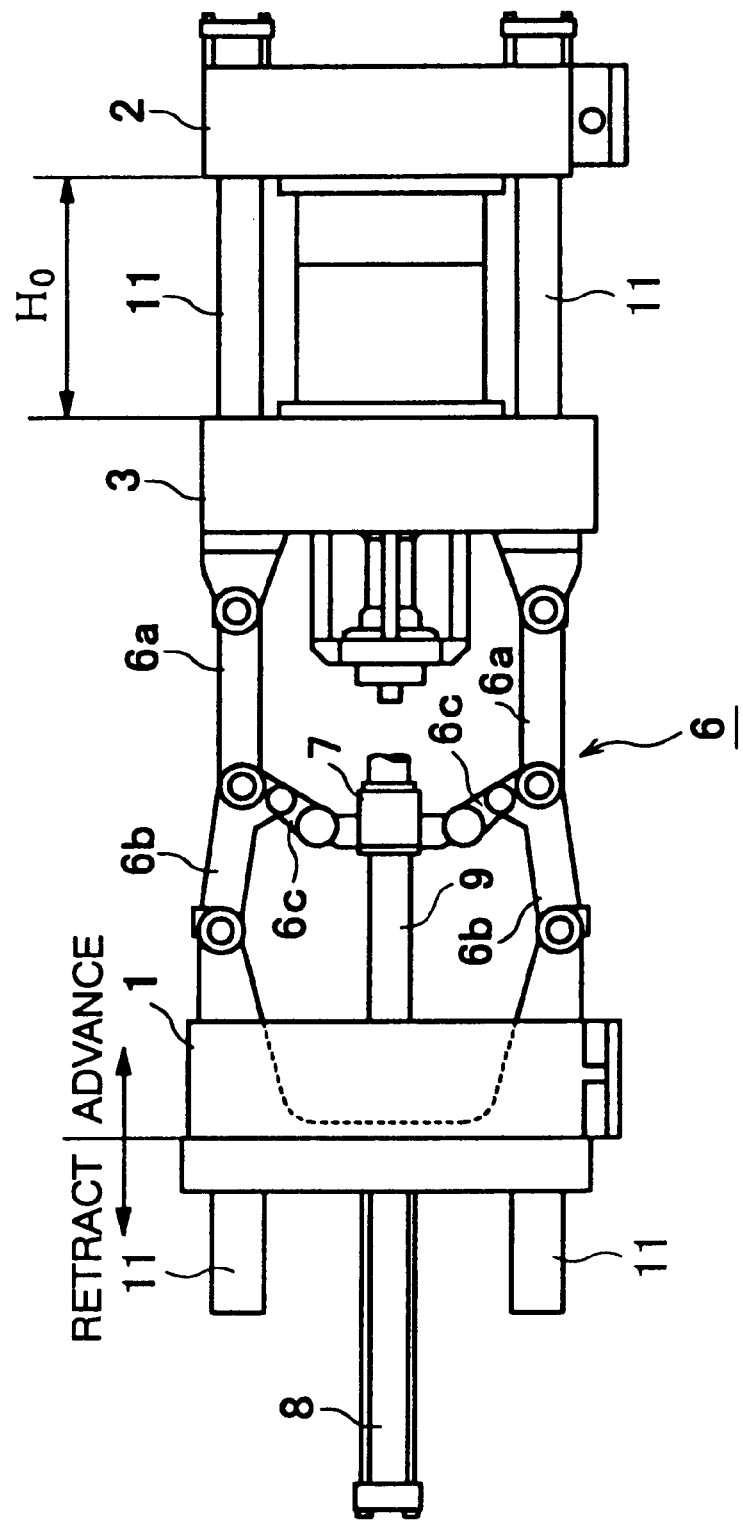
FIG. 3 is a view of a die clamping state of the die clamping apparatus shown in FIG. 1.
Figure 4:
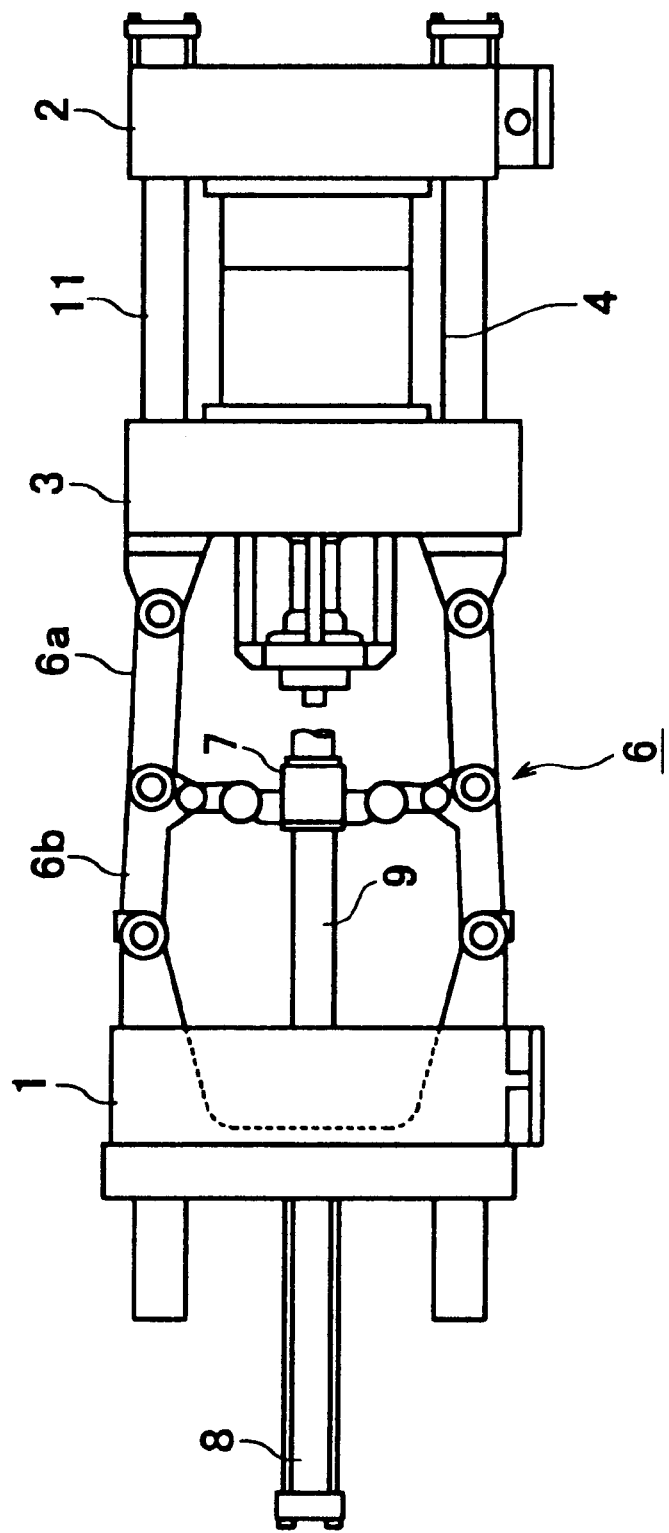
FIG. 4 is a view of a die clamping completion state of the die clamping apparatus shown in FIG. 1.

Below, an explanation will be given of embodiments of the present invention by referring to the drawings.

Figure 5:
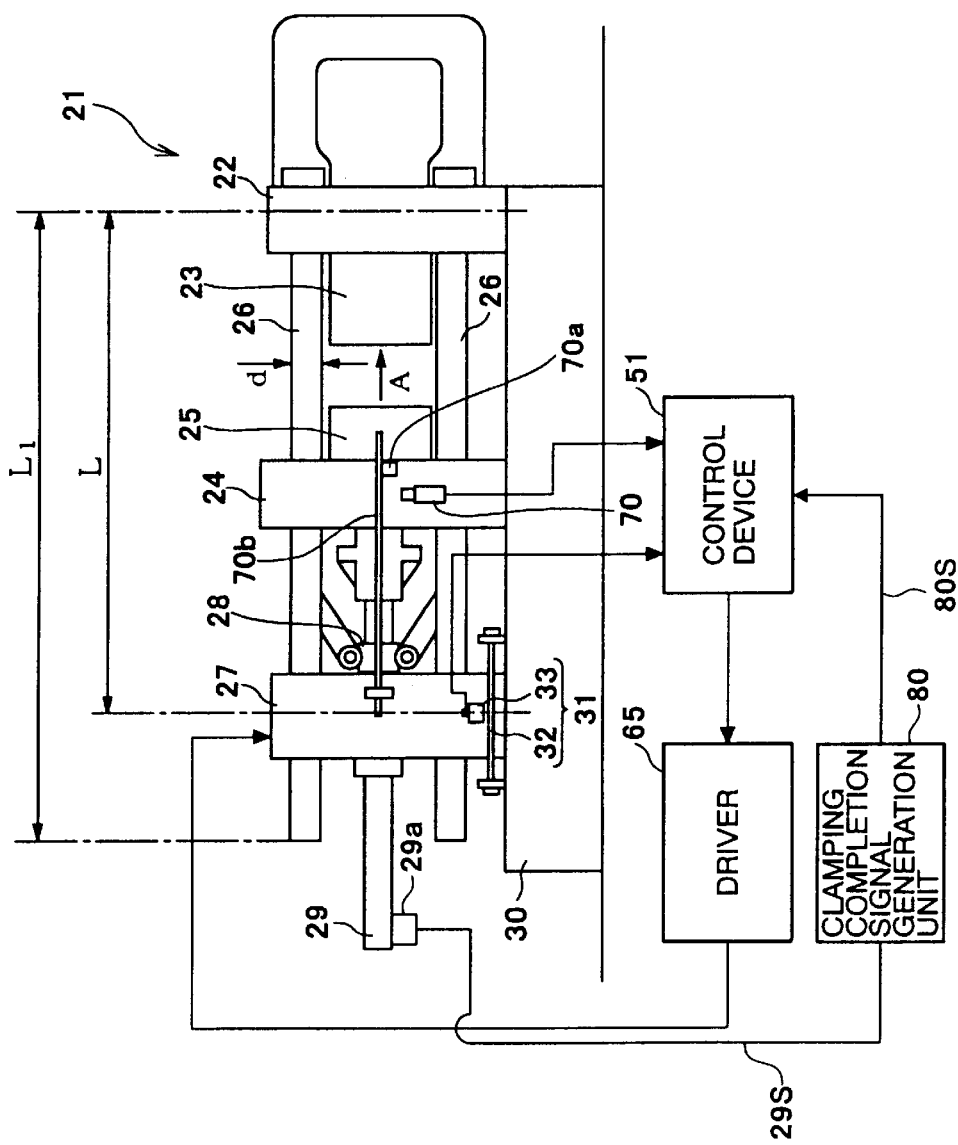
FIG. 5 is a view of the configuration of a die clamping apparatus according to an embodiment of the present invention.

FIG. 5 is a view of the configuration of a die clamping apparatus according to an embodiment of the present invention. The die clamping apparatus 21 according to the present embodiment is applied to for example the die clamping of the die casting machine.

In FIG. 5, the die clamping apparatus 21 is provided with a base 30, a fixed die plate 22 fixed onto the base 30, a fixed die 23 attached to the fixed die plate 22, a movable die plate 24 provided movable on the base 30 facing the fixed die plate 22, a movable die 25 attached to the movable die plate 24 so as to face the fixed die 23, a link housing 27 connected to the fixed die plate 22 by four tie bars 26 while placing the movable die plate 24 therebetween, a toggle mechanism 28 provided between the link housing 27 and the movable die plate 24, and a hydraulic cylinder 29 provided in the link housing 27 and driving the toggle mechanism 28. Note that, it is also possible to configure the device so as to drive the toggle mechanism 28 by using a servo motor and a transmission mechanism for transforming rotational motion of this electric motor to linear motion like a combination of a ball screw and a nut in place of the hydraulic cylinder 29.

Also, the die clamping apparatus 21 is provided with a linear sensor 31 for detecting the position of the link housing 27 on the base 30. This linear sensor 31 is provided with a sensor scale 32 fixed on the base 30 and a sensor head 33 fixed at a predetermined position of the link housing 27 so as to face the sensor scale 32.

The die clamping apparatus 21 is provided with a limit switch 70, and a contact member 70a supported by a support member 70b. The limit switch 70 is mounted on the movable die plate 24. The contact member 70a is supported by an end portion of the support member 70b secured with other end portion on the link housing 27. The contact member 70a is placed at the position to contact to the limit switch 70 when the movable die 25 moves to a position immediately before contact to the fixed die 23. This switch arrangement including the limit switch 70, the contact member 70a and the support member 70b constitute a first state detecting means according to the present invention, which detect a first position of the link housing 27 on the base 30 while the movable die plate 24 moves to its die clamping position from its die opening position without generating any die clamping forces. The reason for holding the contact member 70a at the link housing 27 and holding the limit switch 70 at the movable die plate 24 is that the contact member 70a and the limit switch 70 can be moved together with the movement of the link housing 27 by the position adjustment of the link housing 27.

The die clamping apparatus 21 is provided with a clamping completion signal generation unit 80.

The clamping completion signal generation unit 80 receives as input a detection signal 29s of a pressure sensor 29a attached on the hydraulic cylinder 29 detecting an operative pressure of it. The clamping completion signal generation unit 80 generates a die clamping completion signal 80s to determining the completion of the die clamping of the movable die 25 and fixed die 23 by the complete extension of the toggle mechanism.

This clamping completion signal generation unit 80 generates the die clamping completion signal 80s in case that a state where the detected pressure of the pressure sensor 29a reaches a predetermined pressure after the beginning of the toggle mechanism operation is maintained for a predetermined period.

The clamping completion signal generation unit 80 and the pressure sensor 29a constitute the second state detecting means of the present invention. Note that in case of using a servo motor in place of the hydraulic cylinder 29, it is possible to generate the die clamping completion signal 80s based on the driving current of the servo motor.

The clamping apparatus 21 is provided with a control device 51 to control the clamping apparatus 21. This control device 51 receives as an input signal from the sensor head 33 of the linear sensor, the limit switch 70 and the clamping completion signal generation unit 80. Also, the control device 51 serves as output a control instruction to a control driver 65 by which drives the hydraulic cylinder 29.

In the die clamping apparatus 21 having the above configuration, the toggle mechanism 28 has a similar configuration to that of the toggle mechanism explained in FIG. 1 to FIG. 4. This toggle mechanism 28 changes the relative positions of the movable die plate 24 and the link housing 27 by extension and contraction of the toggle mechanism 28 between the movable die plate 24 and the link housing 27.

For example, when the toggle mechanism 28 performs an extension operation by the clamping cylinder 29 from the die open position shown in FIG. 5 where the movable die 25 is open with respect to the fixed die 23, the movable die plate 24 and the link housing 27 are moved apart. As a result, the movable die plate 24 moves in the direction indicated by an arrow A, that is, a direction in which the movable die 25 moves toward the fixed die 23.

When the toggle mechanism 28 is further extended from the state where the movable die 25 contacts the fixed die 23, the tie bars 26 connecting the link housing 27 and the fixed die plate 22 are elastically deformed to be stretched. A die clamping force corresponding to the amounts of deformation of these tie bars 26 is generated between the movable die 25 and the fixed die 23. At this time, the link housing 27 moves on the base 5 by an amount of movement corresponding to the amounts of deformation of the tie bars 26.

In the die clamping apparatus 21 having the above configuration, the die clamping force between the movable die 25 and the fixed die 23 can be adjusted according to the position of the link housing 27. In FIG. 5, the length L of the portions of the tie bars 26 of the total length of $L_1$ upon which the die clamping force acts can be freely adjusted by adjusting the position of the link housing 27 relative to the tie bars 26.

Figure 6:
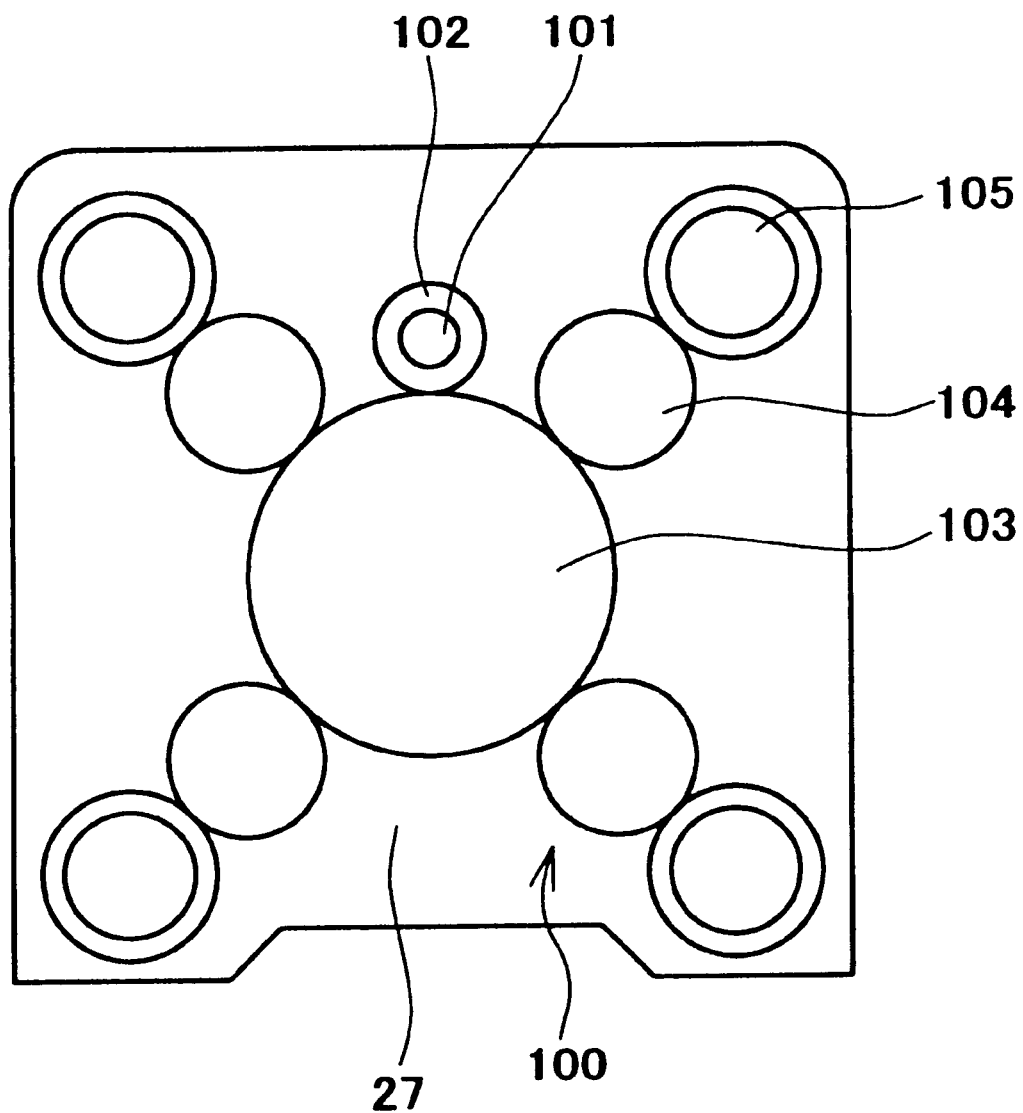
FIG. 6 is a view of an example of the configuration of a position adjustment device of a link housing.

The position adjustment of the link housing 27 is carried out by for example a position adjustment device 100 built in the link housing 27 shown in FIG. 6. Note that, it is necessary to perform the position adjustment of the link housing 27 not only for the adjustment of the die clamping force, but also in a case where the die height between the fixed die 23 and the movable die 25 are changed.

In FIG. 6, the position adjustment device 100 built in the link housing 27 is provided with a motor 101 with a drive gear 102 connected to a rotation shaft, a ring gear 103 rotatably held at the center portion of the link housing 27 and engaging with the drive gear 102, four idle gears 104 rotatably held at the link housing 27 engaged with the ring gear 102, and tie bar nuts 105 having gears engaged with the idle gears 104 formed on their outer circumferences and rotatably held at the link housing 27. Note that, the tie bar nuts 105 are one embodiment of the nut members of the present invention.

In the tie bar nuts 105, threaded holes for engagement with screw portions formed on the periphery of the tie bars 26 are formed in inner circumferential portions. The link housing 27 and the tie bars 26 are connected through these tie bar nuts 105.

The motor 101 is connected to the control driver 65 shown in FIG. 5. The amount of rotation is controlled by the control device 51 through this control driver 65.

In the position adjustment device 100, when the motor 101 is driven and the drive gear 102 rotates, four tie bar nuts 105 synchronously rotate through the ring gear 103 and the idle gears 104.

When the tie bar nuts 105 rotate, the link housing 27 moves in an axial direction of the tie bars 26. By controlling the amount of rotation of the motor 101, the link housing 27 can be moved to an intended position.

Further, after adjusting the position of the link housing 27, by braking the motor 101, the link housing 27 is fixed to the tie bars 26.

In the position adjustment device 100 having the above configuration, the tie bar nuts 105 are engaged with the tie bars 26. Therefore mechanical error such as backlash exists between the tie bar nuts 105 and the tie bars 26. For this reason, when force acts upon the link housing 27 from the toggle mechanism 28, there is a possibility that the link housing 27 will move relative to the tie bars 26 by exactly the amount of this mechanical error.

Figure 7:
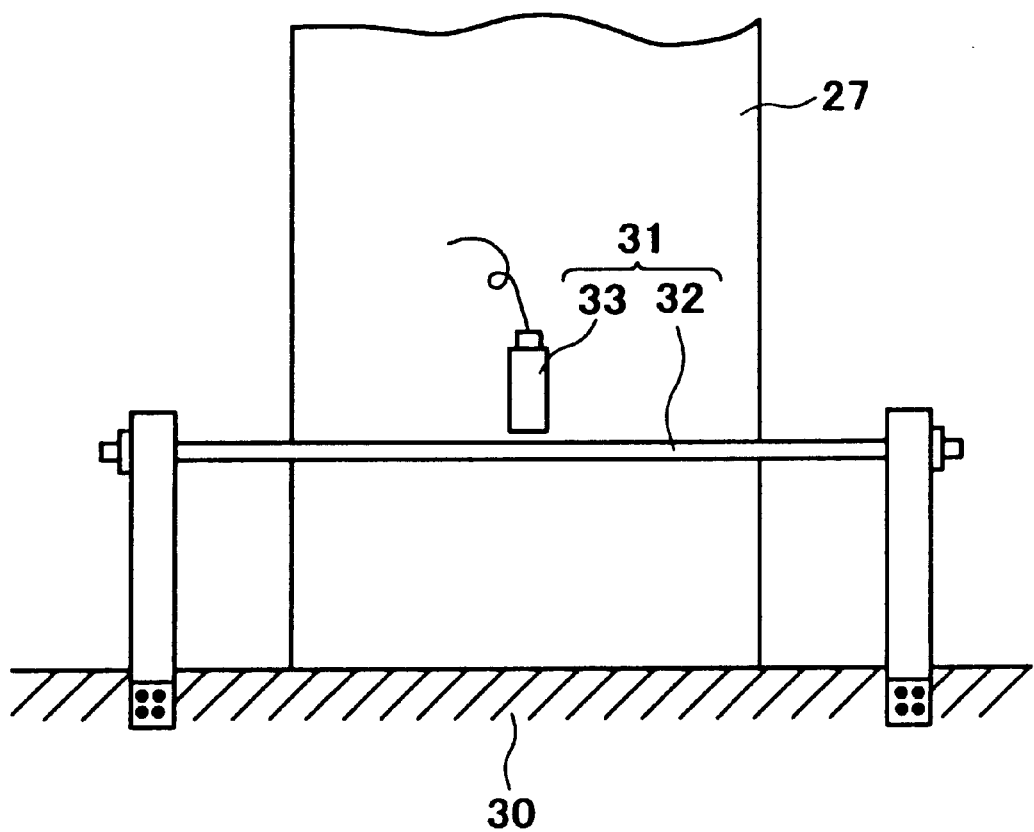
FIG. 7 is a view of an arrangement of a sensor scale 32 and a sensor head 33 of a linear sensor 31.

FIG. 7 is a view of the arrangement of the sensor scale 32 and the sensor head 33 of the linear sensor 31.

As shown in FIG. 7, the sensor scale 32 is provided on the base 30, and the sensor head 33 is fixed to the link housing 27 so as to face this sensor scale 32.

As the linear sensor 31, it is also possible to use one of an incremental type of magnetically or optically detecting the amount of movement of the sensor head 33 relative to the sensor scale 32 and outputting the same as a pulse signal to the control device 51. However, it is necessary to detect the position of the link housing 27 relative to the tie bars 26, that is, the length L of the portion in the total length $L_1$ of the tie bars 26 shown in FIG. 5 with the die clamping force acting thereon, so an absolute type sensor is preferably used. In this case, the reference position of the linear sensor 31 is set in advance so that the detected value of the sensor head 33 becomes equal to the length L in the total length $L_1$ of the tie bars 26 with the die clamping force acting thereon.

Note that a configuration of detecting the position of the link housing 27 by using a combination of rack and pinion gear connected to a rotary encoder in place of the linear sensor 31 can also be employed.

Figure 8:
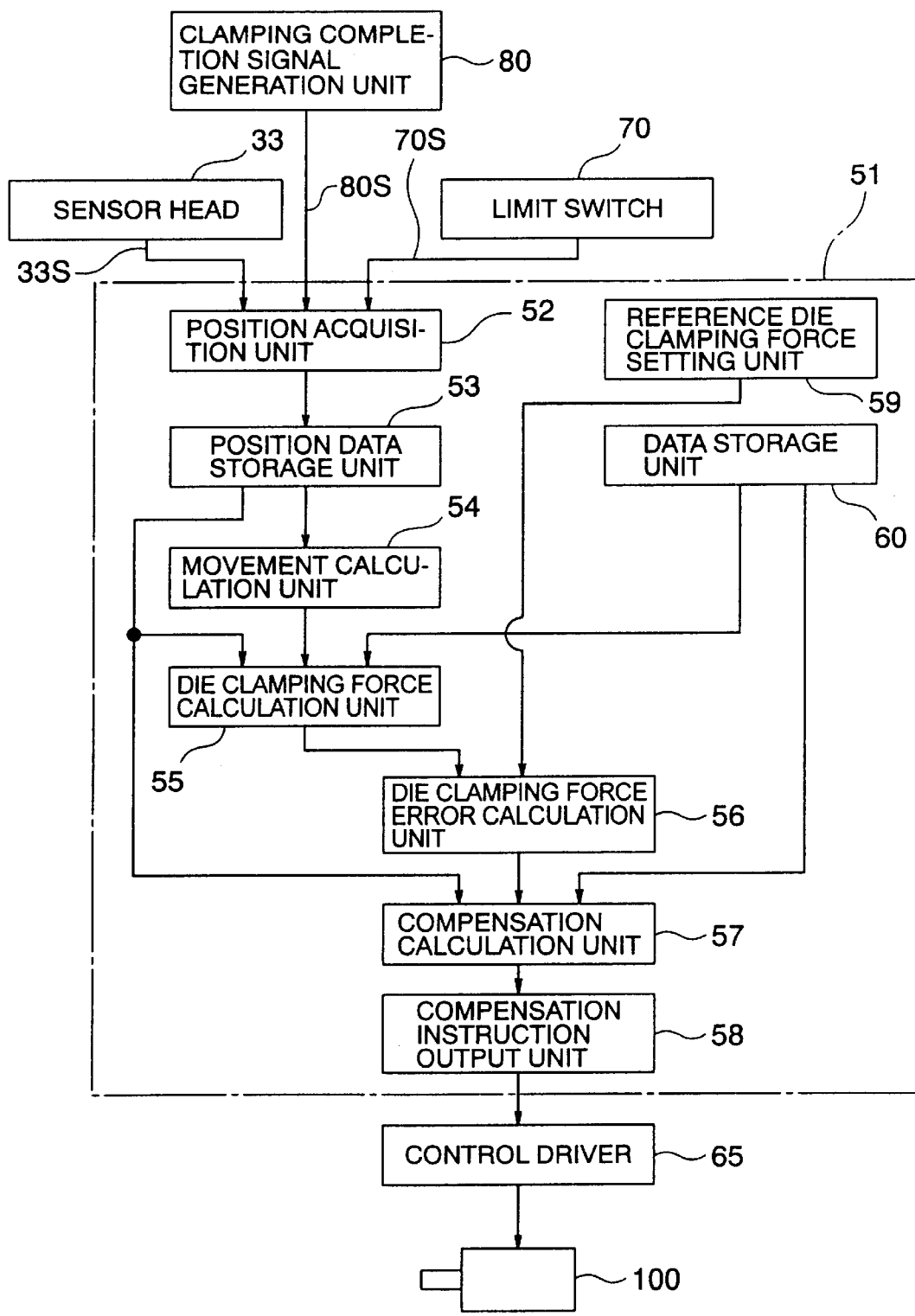
FIG. 8 is a view of the configuration of a control device 51.

FIG. 8 is a functional block diagram of the control device 51.

The control device 51 is provided with a position acquisition unit 52, a position data storage unit 53, a movement calculation unit 54, a die clamping force calculation unit 55, a die clamping force error calculation unit 56, a compensation calculation unit 57, a compensation instruction output unit 58, a reference die clamping force setting unit 59, and a data storage unit 60. Note that, the die clamping force calculation unit 55 corresponds to one concrete example of the die clamping force calculating means of the present invention, while the die clamping force adjusting means of the present invention is constituted by the die clamping force error calculation unit 56, compensation calculation unit 57, compensation instruction calculation unit 58, and the compensation instruction output unit 58.

The position acquisition unit 52 receives as input the position detecting signal 33s from the sensor head 33, the detecting signal 70s from the limit switch 70 and the die clamping completion signal 80s from the clamping completion signal generation unit 80.

The position acquisition unit 52 specifies a first position of the link housing 27 based on the position detecting signal 33s in response to the input of the detecting signal 70s of the limit switch 70, and outputs the first position data of the link housing 27 to the position data storage unit 53. From this first position data, the length L defined as L2 of the portion of the tie bars 26 upon which the die clamping force acts in a non load state (when not deformed) is specified.

Further the position acquisition unit 52 specifies a second position of the link housing 27 based on the position detecting signal 33s in response to the input of the die clamping completion signal 80s, and outputs this second position data to the position data storage unit 53. From this second position data, the length L defined as L3 of the portion of the tie bars 26 upon which the die clamping force acts in the deformed state at the time of the die clamping completion.

The position data storage unit 53 stores and holds the first and second position data acquired by the position acquisition unit 52.

The movement calculation unit 54 compares the each position data stored in the position data storage unit 53 and calculates an amounts of the movement $\Delta L$. The amounts of the movement $\Delta L$ becomes equal to $L_3-L_2$. This amount of the movement $\Delta L$ corresponds to the amount of the deformation of the tie bars 26.

The reference die clamping force setting unit 59 sets and holds a reference die clamping force Fr to be generated between the movable die 25 and the fixed die 23. This die clamping force is set by for example using an input device such as a keyboard provided in the control device 51 and having an operator input the intended reference die clamping force Fr.

The data storage unit 60 stores and holds the data required for the calculation of the die clamping force or the amount of compensation in the die clamping force calculation unit 56 and the compensation calculation unit 57 mentioned later in advance.

The data stored by the data storage unit 60 is specifically a diameter d of the tie bars 26 shown in FIG. 5 and a Young's modulus E of the tie bars 26.

The die clamping force calculation unit 55 calculates a die clamping force F generated between the movable die 25 and the fixed die 23 at the time of completion of the clamping based on the amount of movement $\Delta L$ of the link housing 27 calculated at the movement calculation unit 54, the diameter d of the tie bars 26 stored, and the Young's modulus E of the tie bars 26 in the data storage unit 60.

Here, an explanation will be made of the method of calculation of the die clamping force F.

When the length L of the portion of the tie bars 26 upon which the die clamping force in the non load state acts is $L_2$ and the sectional area of the four tie bars 26 is A, the relationship between the amount of movement $\Delta L$ and the die clamping force F is represented by the following equation (1). Note that, the sectional area A is $\pi d^2$.

$$F/A=E\cdot \Delta L/L_2 \qquad (1)$$

Accordingly, the die clamping force F can be found from the following equation (2):

$$F=\pi d^2\cdot E\cdot \Delta L/L_2 \qquad (2)$$

The die clamping force calculation unit 55 calculates the die clamping force F according to equation (2):

The die clamping force error calculation unit 56 calculates a difference $\Delta F$ between the die clamping force F calculated at the die clamping force calculation unit 55 and the reference die clamping force Fr set in the reference die clamping force setting unit 59 and outputs the same to the correction calculation unit 57.

The correction calculation unit 57 calculates an amount of compensation Lm for compensating the position of the link housing 27 relative to the tie bars 26 so that the die clamping force generated between the movable die 25 and the fixed die 23 becomes the reference die clamping force Fr based on the difference $\Delta F$ between the calculated die clamping force F and the reference die clamping force Fr and outputs the same to the compensation instruction output unit 58.

The amount of compensation Lm and the difference $\Delta F$ between the die clamping force F and the reference die clamping force Fr have the relationship of the following equation (3):

$$\Delta F=(\pi d^2\cdot E\cdot Lm)/(L_2+Lm) \qquad (3)$$

In equation (3), the amount of compensation Lm is negligible small compared with the length $L_2$ of the portion of the tie bars 26 upon which the die clamping force acts in the non load state, so the amount of compensation Lm is represented by the following equation (4):

$$Lm=(\Delta F\cdot L_2)/(\pi d^2\cdot E) \qquad (4)$$

By the calculation in the compensation calculation unit 57 according to above equation (4), the amount of compensation Lm is obtained.

The compensation instruction output unit 58 prepares a control instruction of the motor 101 of the position adjustment device 100 based on the amount of compensation Lm calculated at the compensation calculation unit 51 and outputs the same to the control driver 65.

The control driver 65 controls the rotation of the motor 101 in response to the control instruction from the compensation instruction output unit 58. The link housing 27 is adjusted in position by exactly the amount of compensation Lm. As a result, the die clamping force generated between the movable die 25 and the fixed die 23 is adjusted to the reference die clamping force Fr.

Figure 9:
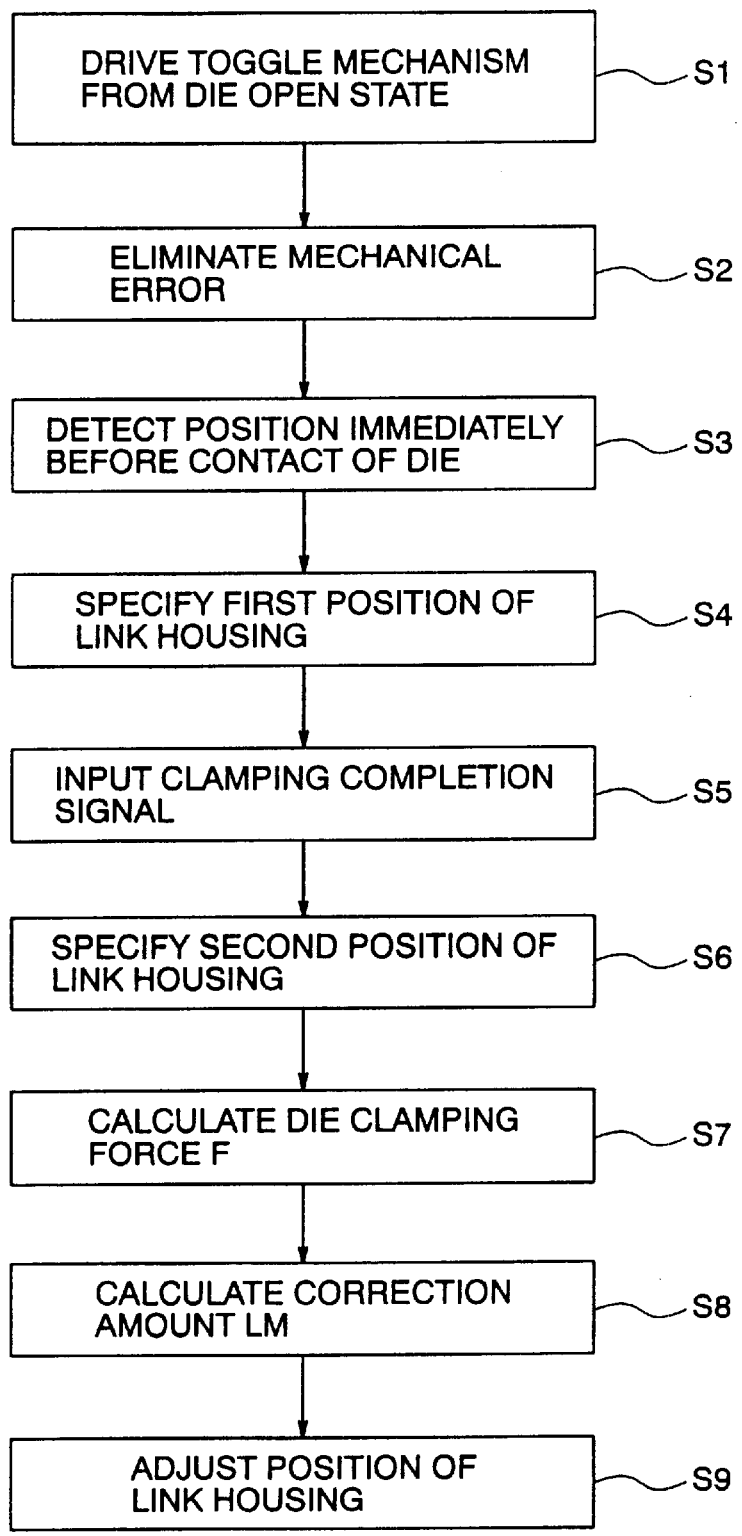
FIG. 9 is a flowchart for explaining a method of measurement of the die clamping force and a method of adjustment of the die clamping force in a die clamping apparatus 21.

Next, an explanation will be made of the method of measurement of the die clamping force and the method of adjustment of the die clamping force in the die clamping apparatus 21 of the above configuration by referring to the flowchart shown in FIG. 9.

First, as shown in FIG. 5, the toggle mechanism 28 is extended from the die open state where the movable die 25 and the fixed die 23 of the die clamping apparatus 21 are open by the control device 51, and the movable die plate 24 is moved in the direction indicated by the arrow A of FIG. 5 (step S1).

At the beginning of the movement of the movable die plate, the speed of the movable die plate 24 is accelerated until the speed reaches a constant speed, then the movable die plate 24 is moved at a constant speed.

By the drive of the toggle mechanism 28, the movable die plate 24 is moved apart from the link housing 27. A reaction force of a direction indicated by an arrow B shown in FIG. 10 acts upon the link housing 27.

At this time, if mechanical error such as backlash exists between the tie bar nuts 105 of the position adjustment device 100 built in the link housing 27 and the tie bars 26 engaged with the same, the link housing 27 moves by exactly the amount of this mechanical error due to the reaction force acting from the toggle mechanism 28, and the mechanical error generated in the position adjustment device 100 is eliminated (step S2). When the movable die 25 moves to a predetermined distance position to the fixed die 23, the control device 51 decreases the speed of the movable die plate 24 to a constant and low speed to relieve the impact at the contact of the movable die 25 and the fixed die 23.

Figure 10:
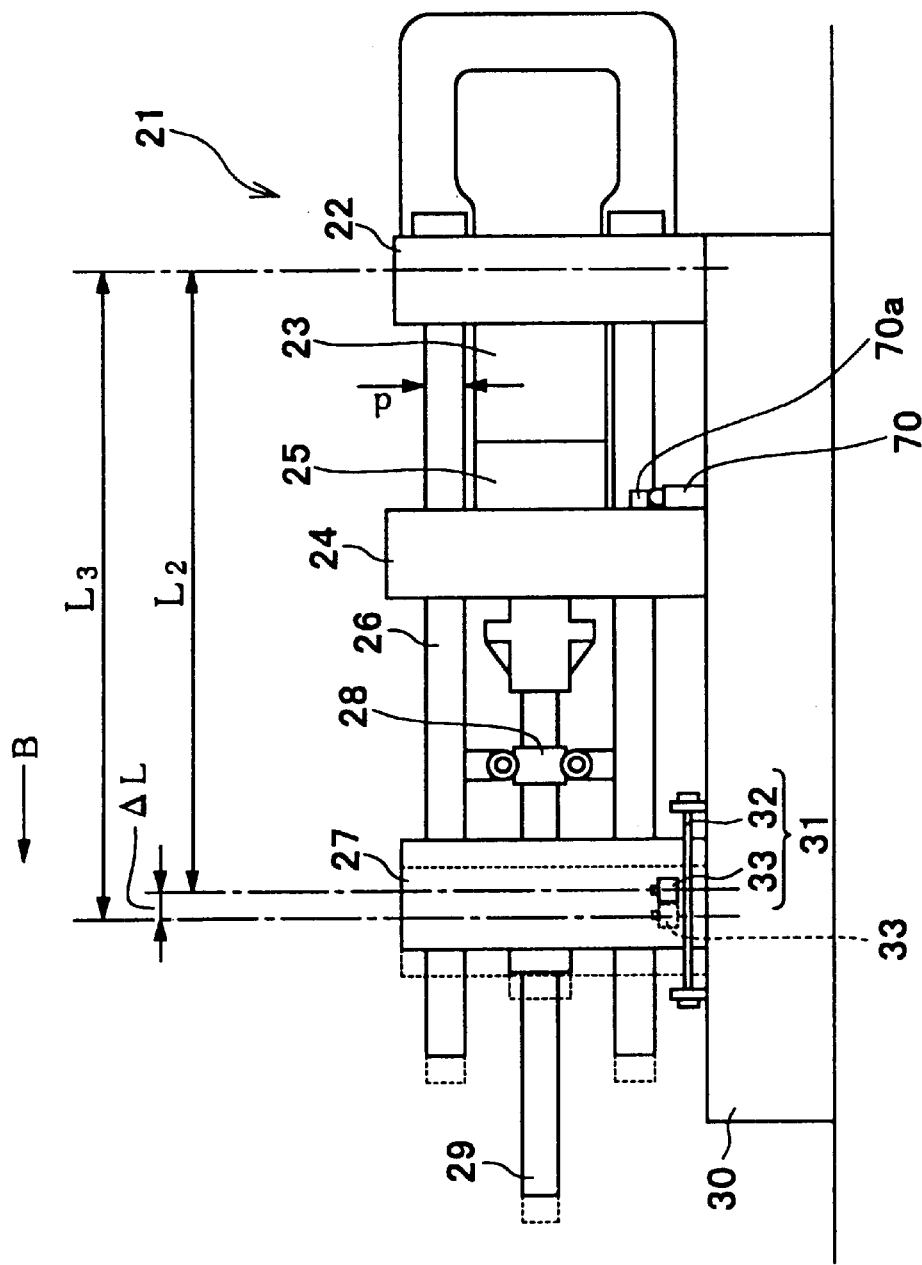
FIG. 10 is a view of a state of operation of the die clamping apparatus 21.

As shown in FIG. 10, when the movable die 25, of which the speed was decreased, moves to a position immediately before the contact of the movable die to the fixed die 23, the contact member 70a contacts the limit switch 70. The detection signal of the limit switch 70 is input to the control device 51 (step S3).

By the input of the detection signal of the limit switch 70 to the control device 51, the first position of the link housing 27 is specified (step S4). From the position of this link housing 27, the length $L_2$ of the portion of the tie bars 26 upon which the die clamping force acts in the non load state shown in FIG. 6 is specified.

When the toggle mechanism 28 further performs the extension operation from the state where the movable die 25 reaches the position immediately before contact with the fixed die 23, the link housing 27 starts to move in the direction indicated by the arrow B of FIG. 10, the load is applied to the tie bars 26 by this, and they are elastically deformed. By the deformation of the tie bars 26, the movable die 25 and the fixed die 23 are clamped. When the toggle mechanism 28 is completely extended and self locks, the clamping completion signal 80s is input to the control device 1 (step S5).

In the control device 51, by the input of the die clamping completion signal 80s, the position of the link housing 27 at the completion of the clamping is specified (step S6). By this, as shown in FIG. 10, the length $L_3$ of the portion of the tie bars 26 upon which the die clamping force acts at the completion of the clamping is specified.

In the control device 51, based on the detected lengths $L_2$ and $L_3$, the amount of movement $\Delta L$ of the link housing 27 is calculated. The die clamping force F is calculated from this amount of movement $\Delta L$ (step S7).

Then, in the control device 51, the amount of compensation Lm of the position of the link housing 27 is calculated from the calculated die clamping force F and the set reference die clamping force Fr (step S8).

Further, the control device 51 outputs the control instruction converted from the calculated amount of compensation Lm to the driver 65. By this, the motor 101 of the position adjustment device 100 is driven, the four tie bar nuts 105 rotate in synchronization, the link housing 27 moves along the tie bars 26 by exactly the amount of compensation Lm, and thus the position is adjusted (step S9).

As described above, in the present embodiment, the first position of the link housing 27 need to measure the die clamping force is specified while the movable die plate 24 is moving.

By the movement of the movable die plate 24 to the fixed die plate 22, a reaction force from the movable die plate 24 through the toggle mechanism acts on the link housing 27 so that the gears of the tie bar nuts 105 of the position adjustment device 100 and the tie bars 26 are reliably engaged. So no component of mechanical error of the position adjustment device 100 is contained in the specified length L2.

During the movable die plate 24 is accelerated and decelerated, the reaction force acting on the link housing 27 from the movable die plate 24 does not become constant. So in the acceleration and deceleration of the movable die plate 24, there is a possibility that the position of the link housing 27 becomes unstable. Accordingly, from a point of view to correctly specify the first position of the link housing 27, it is preferable to specify the first position of the link housing 27 at the time that the movable die plate 25 is moving at a constant speed.

In the present invention, to relieve the impact when the movable die contacts to the fixed die 23, the movable die plate 24 is moved at a low constant speed before contact of the movable die 25 to the fixed die 23. Accordingly, by specifying the first position of the link housing 27 at a position immediately before contact of the movable die 25 to the fixed die 23, it is capable of correctly specifying the first position of the link housing 27.

Further, in the above embodiment, a spur gear type device was mentioned as an example as the position adjustment device 100 with the mechanical error, but other than this, the present invention can be similarly applied to a chain type or worm gear type device.

As described above, the die clamping force can be correctly measured and adjusted to the intended die clamping force without the use of sensors such as load meters for directly detecting the amounts of deformation of the tie bars in the die clamping apparatus.

While the invention has been described by reference to specific embodiments chosen for purposes of illustration, it should be apparent that numerous modifications could be made thereto by those skilled in the art without departing from the basic concept and scope of the invention.

What is claimed is:

1. A die clamping apparatus comprising
   a fixed die plate fixed on a base and holding a fixed die,
   a movable die plate for holding a movable die facing said fixed die and movable on said base,
   a link housing connected with said fixed die plate by tie bars while interposing said movable die plate therebetween and movable on said base,
   a toggle mechanism for generating a die clamping force between said movable die plate and said fixed die plate through said tie bars by moving apart said movable die plate and said link housing,
   a position adjusting means provided between said link housing and said tie bars and connecting the link housing and the tie bars so as to enable the position adjustment of the link housing to said tie bars,
   a link housing position detecting means for detecting a first position of said link housing on said base in a state where said movable die moves from a predetermined die open position to a die closing direction and a die clamping force has not been generated and a second position of said link housing on said base in a state where the clamping is completed, and
   a die clamping force calculating means for calculating the die clamping force based on a difference of said first and second positions detected by said link housing position detecting means.

2. A die clamping apparatus as set forth in claim 1, further comprising a die clamping force adjusting means for calculating an amount of compensation for compensating the position of said link housing to said tie bars so that said die clamping force becomes a reference die clamping force based on a difference between the calculated die clamping force calculated by said die clamping force calculating means and the reference die clamping force set in advance and outputting the same to said position adjusting means.

3. A die clamping apparatus as set forth in claim 2, wherein said link housing position detecting means comprises a position detector for detecting a position of said link housing on said base, a first state detecting means for detecting the state where the movable die plate moved from the predetermined die open position to the die closing direction and the die clamping force has not been generated, a second state detecting means for detecting the state of completion of the clamping, and a position acquisition unit for specifying the first and second positions based on a position detection signal of said position detector and a detection signal of the first and second state detecting means.

4. A die clamping apparatus as set forth in claim 3, wherein said first state detecting means specifying the first position of the link housing when the movable die plate is moving at a constant speed.

5. A die clamping apparatus as set forth in claim 4, wherein said first state detecting means specifying the first position when said movable die is located at a position immediately before contact to said fixed die.

6. A die clamping apparatus as set forth in claim 1, wherein said position adjusting means is provided with nut members engaging with said tie bars and adjusts the position of the link housing by adjustment of the amount of rotation of the nut member.

* * * * *